Jan. 2, 1923.
A. GROUNDMAN.
VEGETABLE PARER AND SLICER.
FILED MAY 13, 1921.
1,440,675
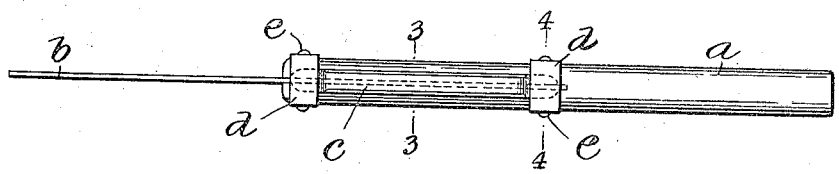
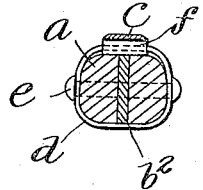 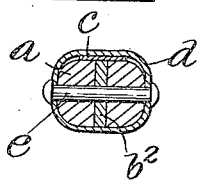 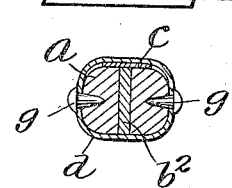
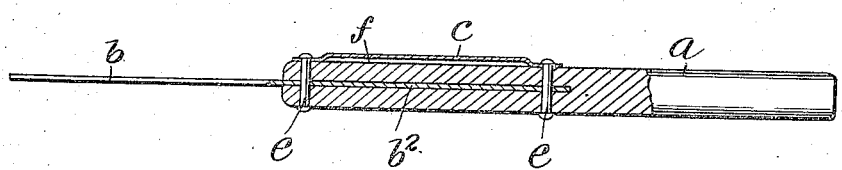
Inventor
Augustus Groundman,
By his Attorneys Patented Jan. 2, 1923.

1,440,675

UNITED STATES PATENT OFFICE.

AUGUSTUS GROUNDMAN, OF NEW YORK, N. Y.

VEGETABLE PARER AND SLICER.

Application filed May 13, 1921. Serial No. 469,122.

*To all whom it may concern:*

Be it known that I, AUGUSTUS GROUNDMAN, a citizen of the United States, and residing at New York, in the county of New York and State of New York, have invented certain new and useful Improvements in Vegetable Parers and Slicers, of which the following is a specification, such as will enable those skilled in the art to which it appertains to make and use the same.

This invention relates to devices for paring or peeling and slicing vegetables, such as potatoes, turnips, apples and the like, and the object thereof is to provide an improved device of this class which is simple in construction, efficient in use, and easily manipulated, and which is in the form of and may be used as an ordinary kitchen knife.

The invention is fully disclosed in the following specification, of which the accompanying drawing forms a part, in which the separate parts of my improvement are designated by suitable reference characters in each of the views, and in which:—

Fig. 1 is a side view of a device of the class specified involving my invention;

Fig. 2 back view thereof;

Fig. 3 a section on the line 3—3 of Fig. 2;

Fig. 4 a section on the line 4—4 of Fig. 2;

Fig. 5 a view similar to Figs. 3 and 4 but showing a modification; and,

Fig. 6 a view similar to Fig. 2 but partially in section and showing a modification.

In the practice of my invention I provide a vegetable parer and slicing device comprising a handle $a$ and a blade $b$, the handle $a$ being preferably longer than that of ordinary kitchen knives and, in the practice of my invention as shown in Figs. 1 to 5 inclusive, I secure to the back of that part of the handle adjacent to the blade $b$ a longitudinal blade $c$, either edge of which may be used as a peeler or scraper. In the construction shown in Figs. 1 to 4 inclusive, the blade $c$ is connected with the handle $a$ by means of bands $d$ through which are passed rivets $e$, which also pass through the shank $b^2$ of the blade $b$, and there is a narrow space $f$ between the blade $c$ and the handle $a$, the end portions of the blade $c$ around which the bands $d$ pass being bent downwardly to form said space.

With this construction the outer end portion of the blade may be grasped in the operation of paring or peeling vegetables of the class specified, and the device may be used with either hand, and after the vegetables have been pared or peeled the entire handle may be grasped, if desired, in the operation of slicing said vegetables.

The construction shown in Fig. 5 is the same as that shown in Figs. 1 to 4 inclusive, except that nails or pins $g$ are employed for securing the bands $d$ to the handle and holding the blade $c$ in position. In the construction shown in Fig. 6, the blade $c$ is placed on one side of the handle parallel with the blade $b$ and secured in place by the rivets $e$ which also pass through the shank of the blade.

In addition to the purposes herein set out, my improvement may also be used for other purposes as will be readily understood, and while I have shown and described the construction which I prefer, my invention is not limited to the details of construction, and changes therein and modifications thereof may be made made, within the scope of the appended claims, without departing from the spirit of my invention or sacrificing its advantages.

Having fully described my invention, what I claim as new and desire to secure by Letters Patent, is:—

1. A vegetable parer and slicing device comprising a handle provided at one end with a main blade the shank of which is mounted in said handle, a supplemental blade mounted on said handle adjacent to the shank of the main blade and parallel therewith, said supplemental blade being provided with an outwardly pressed portion between which and the handle is a narrow space, and means for securing said main and supplemental blades to said handle.

2. A vegetable parer and slicing device comprising a handle provided at one end with a main blade the shank of which is mounted in said handle, a supplemental blade mounted on said handle adjacent to the shank of the main blade and parallel therewith, said supplemental blade being provided with an outwardly pressed portion between which and the handle is a narrow space, and bands mounted on said handle for securing said supplemental blade thereto.

3. A vegetable parer and slicing device comprising a handle provided at one end with a main blade the shank of which is mounted in said handle, a supplemental blade mounted on said handle adjacent to the shank of the main blade and parallel with said handle, said supplemental blade being provided with an outwardly pressed portion between which and the handle is a narrow space, bands mounted on said handle for securing said supplemental blade thereto, and means passed through said bands and handle for securing said main blade to said handle.

4. A vegetable parer and slicing device comprising a handle having a forked or split end portion, a main knife blade the shank of which is mounted in the split end portion of the handle, a supplemental blade mounted on the handle and composed of a strip of metal the ends of which are offset, and means for securing said knife blade and said supplemental blade to said handle.

In testimony that I claim the foregoing as my invention I have signed my name in presence of the subscribing witnesses this 12th day of May, 1921.

AUGUSTUS GROUNDMAN.

Witnesses:
C. E. MULREANY,
H. E. THOMPSON.